United States Patent [19]
Ohtsuka et al.

[11] Patent Number: 5,774,308
[45] Date of Patent: Jun. 30, 1998

[54] THIN FILM INDUCTIVE HEAD AND MAGNETIC WRITING/READING DRIVE INCLUDING THE SAME

[75] Inventors: Yoshinori Ohtsuka; Junzo Toda, both of Kanagawa, Japan

[73] Assignee: Fujitsu Limited, Kawasaki, Japan

[21] Appl. No.: 730,101

[22] Filed: Oct. 15, 1996

[30] Foreign Application Priority Data

Apr. 26, 1996 [JP] Japan ..................................... 8-106931

[51] Int. Cl.⁶ ............................... G11B 5/31; G11B 5/39; G11B 5/187
[52] U.S. Cl. ........................... 360/126; 360/113; 360/119
[58] Field of Search ..................................... 360/126, 121, 360/113, 119

[56] References Cited

U.S. PATENT DOCUMENTS

| | | | |
|---|---|---|---|
| 4,380,784 | 4/1983 | Desserre et al. | 360/126 |
| 4,386,383 | 5/1983 | Desserre et al. | 360/119 |
| 5,168,409 | 12/1992 | Koyama et al. | 360/113 |
| 5,195,004 | 3/1993 | Okuda et al. | 360/126 |
| 5,402,295 | 3/1995 | Suzuki et al. | 360/113 |
| 5,438,747 | 8/1995 | Krounbi et al. | 360/113 |

FOREIGN PATENT DOCUMENTS 6131630  5/1994  Japan .

OTHER PUBLICATIONS

S.X. Wang and P.R. Webb, "Modeling of Submicron Trackwidth Inductive Write Head Designs", IEEE, Trans. Magn., vol. 31, p. 2687.

*Primary Examiner*—Robert S. Tupper
*Attorney, Agent, or Firm*—Greer, Burns & Crain, Ltd.

[57] ABSTRACT

A thin film inductive head for use in writing/reading magnetic signals in a magnetic disk drive or a magnetic tape unit, comprises two magnetic cores formed of respective magnetic layers, said two magnetic layers putting conductor coils therebetween in a vertical direction, front end portions thereof opposing to each other via a gap layer, a part of said front end portion of one magnetic layer having high saturation magnetic flux density rather than a remaining part thereof.

13 Claims, 12 Drawing Sheets

THIN FILM INDUCTIVE HEAD AND MAGNETIC WRITING/READING DRIVE INCLUDING THE SAME

BACKGROUND OF THE INVENTION

1. Field of the Invention

The present invention relates to an inductive head (IND head) for use in the writing of magnetic signals in a magnetic disk drive or a magnetic tape drive, a method for fabricating the IND head, and a magnetic writing/reading drive using the magnetoresistive/inductive head (MR/IND head) head.

2. Description of the Prior Art

In recent years, the MR/IND head has received much attention because it can be fitted for high writing density and miniaturization of the magnetic disk drive. High performance has been required of the MR/IND head. Development of the high performance MR device has been in progress in the field of the reading head (MR head). The spin valve magnetoresistive device(spin valve MR device), etc. which does not depend on the moving velocity of the magnetic writing medium and can provide high output magnetic signals are now observed with attention. On the other hand, high performance has also been desired in the field of the writing head. Such MR/IND head has been requested that allows writing of the magnetic signals up to a high frequency range and less writing spread.

FIG. 1A is a perspective view showing a merged type MR/IND head in the prior art. FIG. 1B is a sectional view showing the merged type MR/IND head taken along a line I—I in FIG. 1A. FIG. 2 is a front view showing an air bearing surface(ABS) of the MR/IND head in FIG. 1A in cross section when viewed from the front end side.

As shown in FIGS. 1A, 1B and 2, in the reading side (R), a lower magnetic shield 1 and an upper magnetic shield 4 are formed beneath and on a magnetoresistive device (MR device) 2 respectively so as to put the MR device 2 therebetween in the vertical direction. In order to prevent the magnetic field generated at the adjacent writing track from entering to the MR device, the lower magnetic shield 1 and the upper magnetic shield 4 of the MR device 2 are formed to have a large width in the track width direction.

In the writing side (W), a lower magnetic core 4 of the writing head is commonly used as the upper magnetic shield 4 of the reproduction head. An upper magnetic core 6 of the writing head is formed on the lower magnetic core 4 via an insulating film 5. The ABS of the upper magnetic core 6 is narrowed in width to coincide with a width of the writing track. For ease of workability, NiFe is selected as the material for the upper magnetic core 6. Additionally, a conductive coil 8 is put between the lower magnetic core 4 and the upper magnetic core 6, and is isolated from them by the insulating film 5.

In order to achieve high performance, the writing magnetic field strength has been increased higher than that of the above MR/IND head. Notably, there has been an instance wherein a FeN film is formed on the portion of the upper magnetic core made of an NiFe film, which opposes to the lower magnetic core (Japanese Patent Application Publication TOKUKAIHEI6-131630).

However, if the lower magnetic core 4 is formed wider, the writing magnetic field is spread in the track width direction. As shown in FIG. 6B, the magnetization recorded on the writing track is spread beyond a specified width of the writing region and is bent at both writing spreading portions. Reasons for this phenomenon would be considered as follows. Since the ABS of the upper magnetic core 6 of the magnetic head (magnetic field outflow side) is thin, a magnetic flux is easily saturated in the side walls thereof and the opposing portion thereof opposing to the lower magnetic core 4. Therefore, magnetic saturation begins to spread gradually from the ABS upon writing the magnetic signals. Therefore, as shown in FIG. 6B, since the magnetic saturation region spreads gradually from the ABS, lines of magnetic force are correspondingly generated from portions which are remote from the ABS.

Because of this phenomenon, writing magnetization recorded on the magnetic writing medium 10 has been spread in width, and both end portions of writing magnetization have been bent due to a lag in phase of the line of magnetic force output from portions which are far from the ABS.

Bending of the writing magnetization on both end portions cause noises in reading the magnetic signals, thereby causing reading error. Such spread of the writing magnetization prevents high writing density in the writing track.

In the literature (S. X. Wang and P. R. Webb; "Modeling of Submicron Trackwidth Inductive Write Head Designs", IEEE, Trans. Magn., vol.31, p.2687, 1995), the MR/IND head has been investigated, in which FeN of high saturation magnetic flux density (Bs) is used as the soft magnetic material of the upper magnetic core. FeN is effective to suppress magnetic saturation. However, FeN can be deposited only by a reactive sputtering method. Therefore, to work the FeN into the magnetic core, a suitable etching process is needed. In this event, etching products stick to the side walls of the etching mask and remain as flash. The problem arises that cracks are ready to occur even if the etching process has been effected well, and therefore the FeN is hard to use.

In the above literature, the FeN film used as the upper magnetic core is provided as a shunt on the side portions of the gap so that the magnetic field does not leak from the edge portions of the gap to the outside of the gap. However, expected results have not been obtained and, on the contrary, the spread of the magnetic field is enhanced over that of the ordinary MR/IND head.

SUMMARY OF THE INVENTION

It is an object of the present invention to provide an IND head capable of suppressing the spread of the writing magnetic field at ABSs of magnetic cores in the writing head side, a magnetic writing/reading drive using the MR/IND head, and a method for fabricating the IND head.

The IND head of the present invention has two magnetic cores, ABS's of which are formed in an opposing relation to each other via the gap layer. Side walls of the ABS of at least one magnetic core are formed to have a higher saturation magnetic flux density than that of the remaining portion of the magnetic core.

Accordingly, upon effecting magnetic writing on the magnetic writing medium, magnetic saturation on the side portions of the magnetic core can be suppressed. Therefore, an outflow area of lines of the magnetic force can be restricted within the opposing surface to the magnetic writing medium and its neighboring area, so that the spread of the magnetic field to the outside of the gap can be suppressed. Thus, since magnetization recorded on the magnetic writing medium is not spread in width nor bent at both end portions, error can be prevented in reading the magnetic signals and high density writing of the magnetic signals can also be implemented.

Since the side walls of one magnetic core and the opposing surface of one magnetic core opposing the other magnetic core are formed to have high saturation magnetic flux density, magnetic saturation of the magnetic core in writing the magnetic signals can be suppressed. Thus, lines of the magnetic force are generated only from the surface of the magnetic core opposing the magnetic writing medium and its neighboring surface, and therefore spread of the magnetic field to the outside of the gap can be more effectively suppressed.

Since either the side walls of one magnetic core or both the side walls and the opposing surface of one magnetic core are formed to have high saturation magnetic flux density and in addition the surface layer of the other magnetic core is formed to have high saturation magnetic flux density, magnetic saturation can be suppressed on not only one magnetic core but also on the other magnetic core. Therefore an outflow region and an inflow region of lines of the magnetic force are in no degree extended and thus the spread of the magnetic field from the magnetic core to the outside of the gap can be effectively suppressed.

In addition, since a portion of the lower magnetic core which opposes the upper magnetic core is formed to protrude with substantially the same width as that of the upper magnetic core, lines of the magnetic force output from the upper magnetic core do not spread to the outside of the gap but enter into the projection portion of the lower magnetic core via the magnetic writing medium. Accordingly, in cooperation with the magnetic saturation suppressing effect caused by one magnetic core, the spread of the magnetic field in the direction of the writing track width can be suppressed.

Further, instead of projecting the lower magnetic core with the same width as the upper magnetic core, widths of upper magnetic core and the lower magnetic core may be set to be substantially equal.

Further, if a width of the lower magnetic core is narrowed similarly to that of the upper magnetic core, magnetic saturation occurs easily in the lower magnetic core. Thus, it is effective in suppressing magnetic saturation to provide a higher saturation magnetic flux density to the side surfaces and the opposing surface of the lower magnetic core than to the remaining portion of the lower magnetic core.

Furthermore, according to the method for fabricating the IND head of the present invention, if the second soft magnetic film, e.g., NiFe film, is covered with the high saturation magnetic flux density film, e.g., FeN film, and then patterned by virtue of anisotropic etching, the high saturation magnetic flux density film can be formed on the side walls of the second soft magnetic film without the etching mask. Therefore, since flashes of the high saturation magnetic flux density film do not remain, and principal portions of the magnetic core are formed of the NiFe film, the generation of cracks can also be prevented.

In the meanwhile, it has been well known that, if the FeN film is etched by ion milling or sputter etching, the materials sputtered from etching products would redeposit to the side walls of the projection. This nature is utilized in another method for fabricating the IND head of the present invention. In other words, after the soft magnetic film is selectively formed in compliance with the plating mask on the high saturation magnetic flux density film, e.g., FeN film, the base high saturation magnetic flux density film is etched so as to form the high saturation magnetic flux density films as the etching products on the side walls of the second soft magnetic film. For this reason, the high saturation magnetic flux density film can be formed on the side walls and the opposing surface of the second soft magnetic film without the etching mask. Therefore, since flashes of the high saturation magnetic flux density film do not remain and principal portions of the magnetic core are also formed of the NiFe film, the generation of cracks can be prevented.

According to the magnetic writing/reading drive of the present invention, since the MR/IND head is installed therein, lines of magnetic force which enter from or to the ABS of the magnetic core in the writing portion to or from the magnetic writing medium can be suppressed from being spread to the outside of the gap.

Therefore, since the spread of writing magnetization recorded on the magnetic writing medium and the bending of writing magnetization at both end portions can be suppressed, the signal error can be prevented in reading the magnetic signals, and high density writing of the magnetic signals can also be improved.

DESCRIPTION OF THE PREFERRED EMBODIMENTS

Preferred embodiments of the present invention will be explained with reference to accompanying drawings hereinbelow.

(1) First Embodiment

Figure 1A:
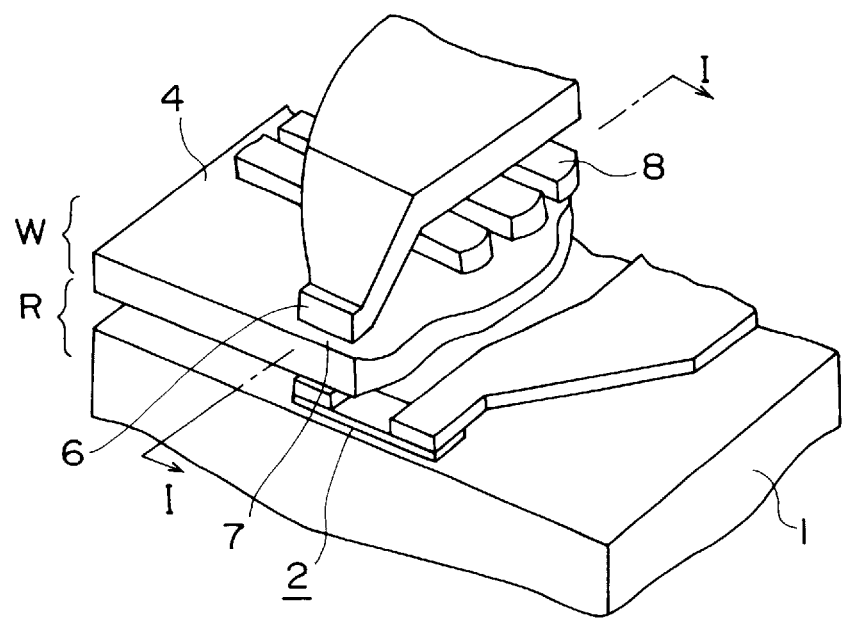
FIG. 1A is a perspective view showing an ABS of an MR/IND head in the prior art.
Figure 1B:
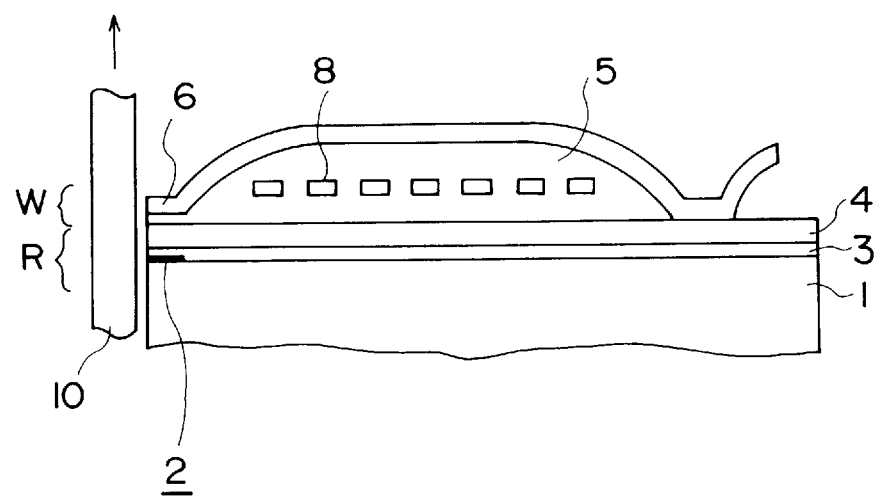
FIG. 1B is a sectional view showing the ABS taken along a line I—I in FIG. 1A.
Figure 2:
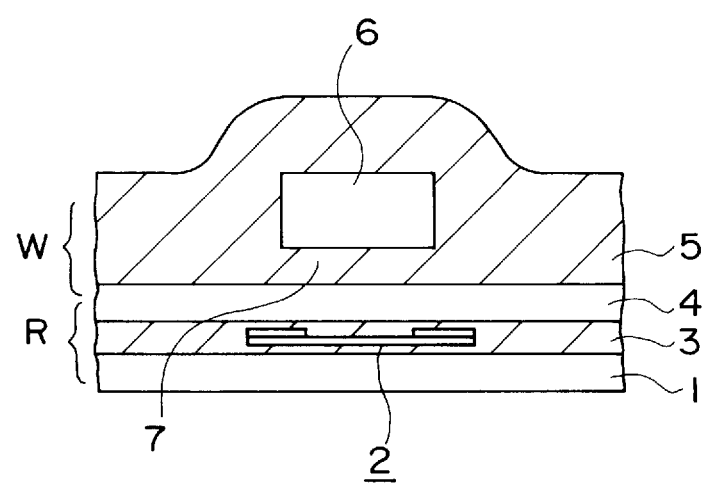
FIG. 2 is a front view showing in cross section the ABS in FIG. 1A.
Figure 3A:
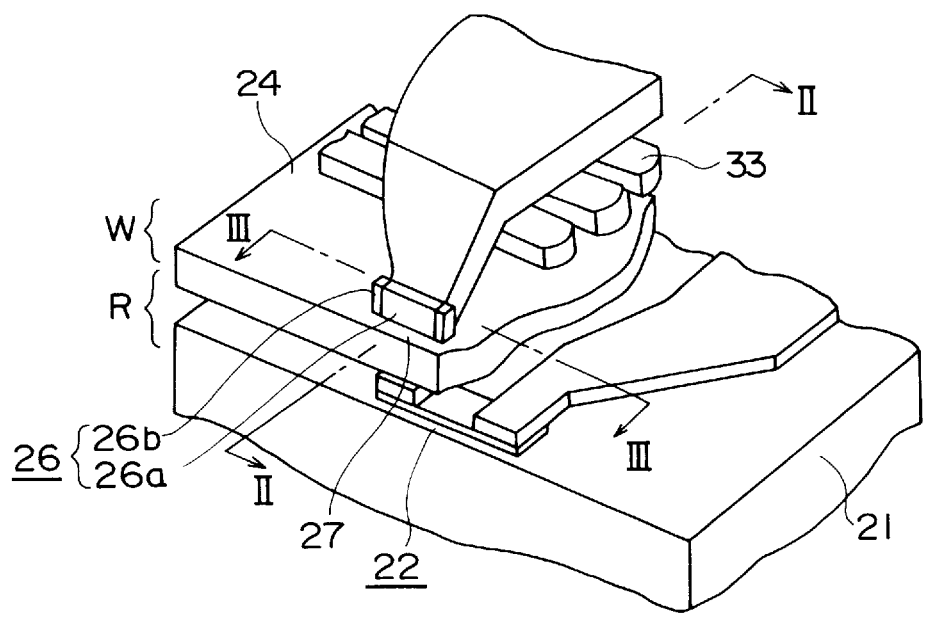
FIG. 3A is a perspective view showing the ABS of the MR/IND head according to the first embodiment of the present invention.
Figure 3B:
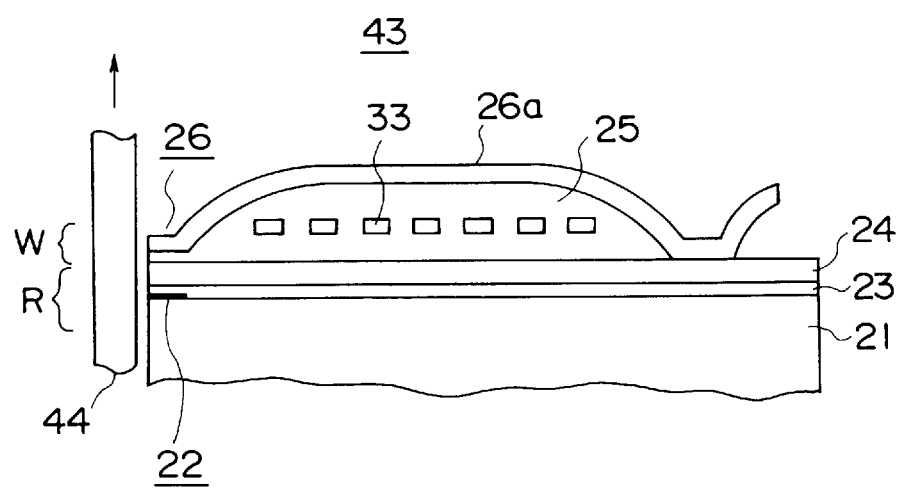
FIG. 3B is a sectional view showing the ABS taken along a line II—II in FIG. 3A.
Figure 4:
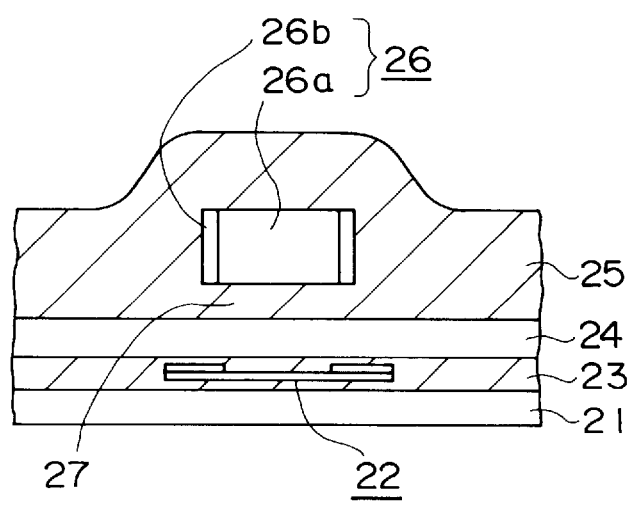
FIG. 4 is a front view showing in cross section a ABS of an MR/IND head according to a first embodiment of the present invention.

FIG. 3A is a perspective view showing the ABS(front end portion) of the MR/IND head according to the first embodiment of the present invention. FIG. 3B is a sectional view showing the ABS of the MR/IND head taken along a line II—II in FIG. 3A. FIG. 4 is a sectional view showing the ABS of the MR/IND head taken along a line III—III in FIG. 3A.

As shown in FIG. 3A, in the reproducing side (R), a lower magnetic shield 21 and an upper magnetic shield 24 are vertically formed beneath and on a magnetoresistive device (MR device) 22 respectively so as to put the MR device 22 therebetween. Between the MR device 22 and the lower magnetic shield 21 and between the MR device 22 and the upper magnetic shield 24 are interposed respectively insulating films 23 which are formed of alumina film or silicon oxide film. In order to prevent the magnetic field from adjacent writing track from an entering the MR device, the lower magnetic shield 21 and the upper magnetic shield 24 are formed to have a larger width in the track width direction.

In the writing side (W), also serves as the upper magnetic shield 24 of the reproduction head a lower magnetic core (a first soft magnetic layer) of the writing head. NiFe film is used as the lower magnetic core 24.

In the ABS of the MR/IND head, an upper magnetic core (an second soft magnetic layer) 26 of the writing head is formed on the lower magnetic core 24 via an insulating film (gap layer) formed of alumina film or silicon oxide film.

An ABS of the upper magnetic core 26 is narrowed in width to coincide with a writing track width. A distance of a gap 27 is determined by a film thickness of the gap layer. The upper magnetic core 26 is formed of NiFe film (remaining portion) 26a. An FeN film (high saturation magnetic flux density film) 26b with high saturation magnetic flux density (Bs) is formed on entire surfaces of both sides of the narrowed ABS. The NiFe film 26a has Bs of about 1 T while the FeN film 26b has Bs of 2 T.

In the center portion of the MR/IND head, a conductive coil 33, which generates a magnetic field for writing, is put between the lower magnetic core 24 and the upper magnetic core 26, and is isolated from them by the insulating film 25.

Further, an allover upper magnetic core 26 is covered with an insulating film 25 formed of alumina film or silicon oxide film.

Next, a method for fabricating the MR/IND head according to the first embodiment of the present invention will be explained with reference to FIGS. 5A to 5E. FIGS. 5A to 5E are sectional views showing fabricating steps in the method for fabricating the MR/IND head.

Figure 5A:
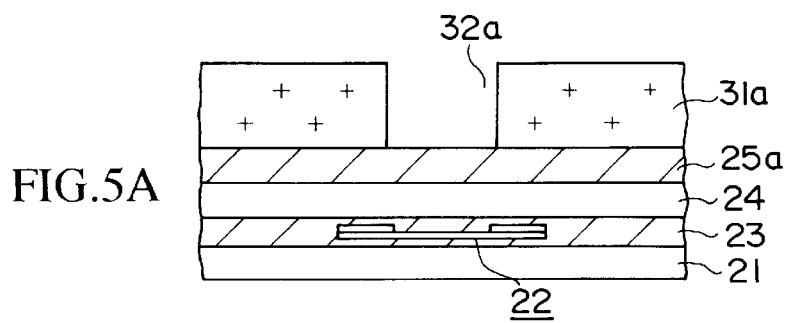
FIGS. 5A to 5E are sectional views showing a method for fabricating the MR/IND head according to the first embodiment of the present invention.

First the situation prior to formation of the upper magnetic core 26 will be illustrated in FIG. 5A. As shown in FIG. 5A, the upper magnetic shield 24 is formed on the lower magnetic shield 21 on the reproducing side (R) via the insulating film 23. The insulating film 23 is formed of alumina film or silicon oxide film of about 50 to 400 nm thick, while the upper magnetic shield 24 is formed of NiFe film of about 0.5 to 3 $\mu$m thick. The MR device 22 is formed between the lower magnetic shield 21 and the upper magnetic shield 24, and isolated from the lower magnetic shield 21 and the upper magnetic shield 24.

The insulating film (gap layer) 25a made of alumina film or silicon oxide film of about 0.1 to 0.6 $\mu$m thick is formed on the upper magnetic shield 24. The film thickness of the gap layer 27 defines the distance in the gap of the writing head.

Figure 5B:
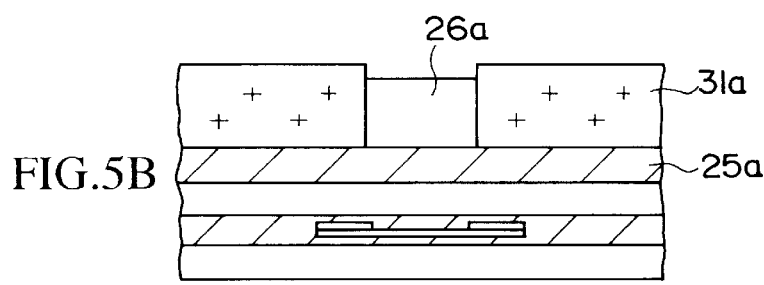

In this state, as shown in FIG. 5B, a resist pattern 31a is formed on the insulating film 25a. Openings 32a each having a width of 3 to 4 $\mu$m are formed in the resist pattern 31a to form the upper magnetic core 26 on the insulating film 25a.

Then, a NiFe film 26a of about 3 $\mu$m thick is formed in the openings 32a of the resist pattern 31a by virtue of plating using the resist pattern 31a as a mask.

Figure 5C:
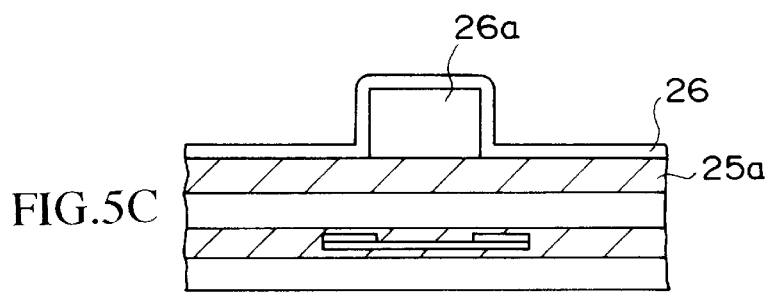

In turn, as shown in FIG. 5C, the FeN film 26b of 100 to 1500 nm thick is formed by sputtering after the resist pattern 31a is removed.

Figure 5D:
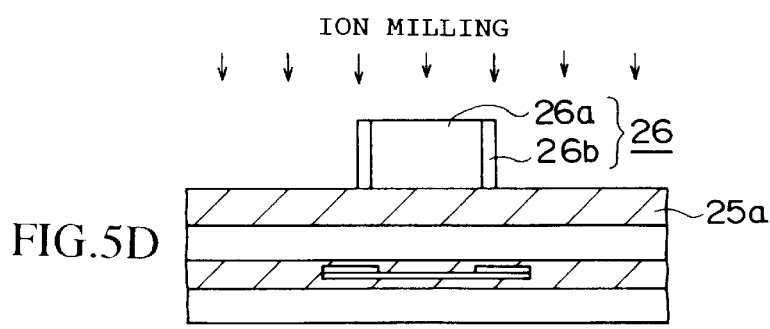

Subsequently, with the use of ion milling using argon gas, the FeN film 26b is etched by anisotropic etching to leave the FeN film 26b only on the side walls of the NiFe film 26a. In this event, since no etching mask is required, it is not probable that the etching products of the FeN film 26b will stick to the side walls of the etching mask, so that they in no way remain as flashes. Thereby, as shown in FIG. 5D, the upper magnetic core 26 in which the FeN film 26b is formed on the side walls of the ABS of the NiFe film 26a is finished.

Figure 5E:
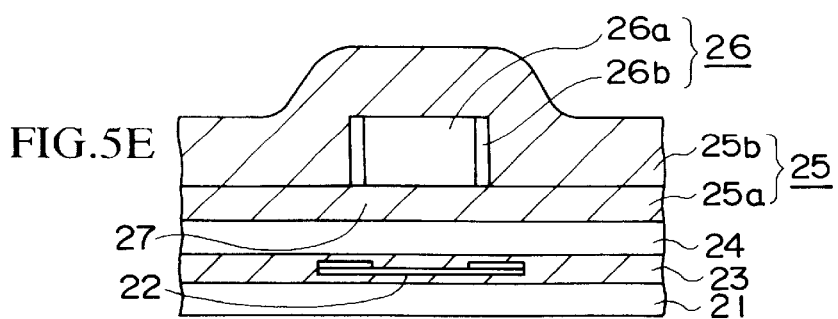

Next, as shown in FIG. 5E, the insulating film 25b made of alumina film or silicon oxide film is then formed to cover the upper magnetic core 26. Thereafter, the magnetoresistive head has been finished through predetermined fabricating steps.

In the above embodiment, although the FeN film 26b is formed on entire side surfaces of the NiFe film 26a instead of on side surfaces of the ABS of the NiFe film 26a only, neither the effect of suppressing the magnetic saturation in the ABS nor other magnetic characteristics are affected by such alteration.

Figure 6A:
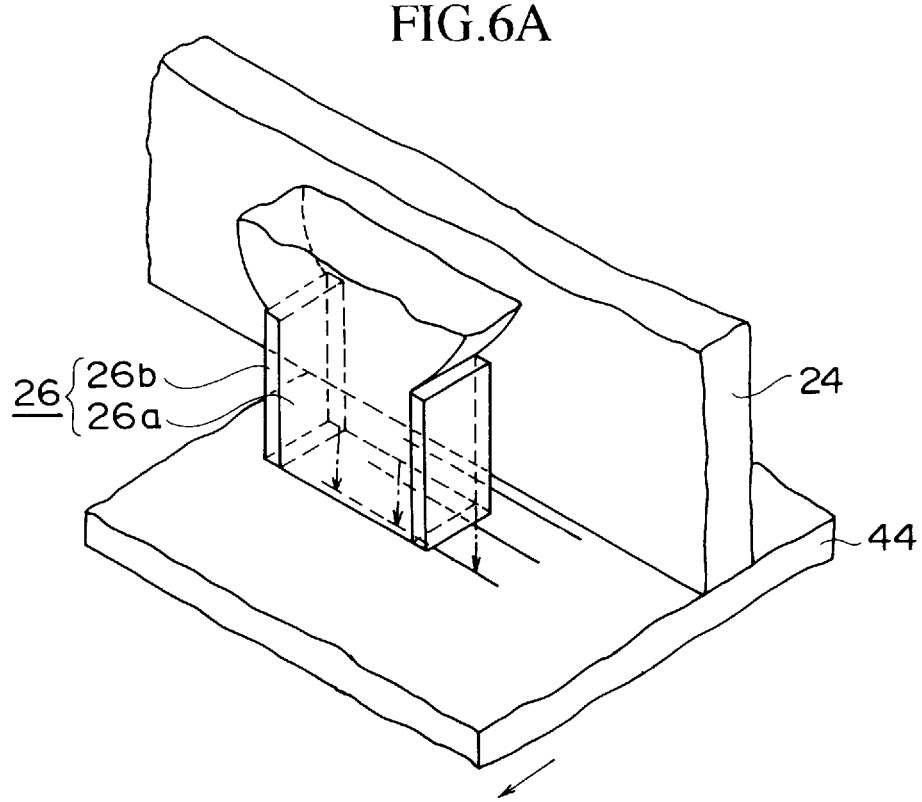
FIG. 6A is a perspective view illustrating process for writing magnetic signals on a magnetic writing material with the use of the MR/IND head according to the first embodiment of the present invention.
Figure 6B:
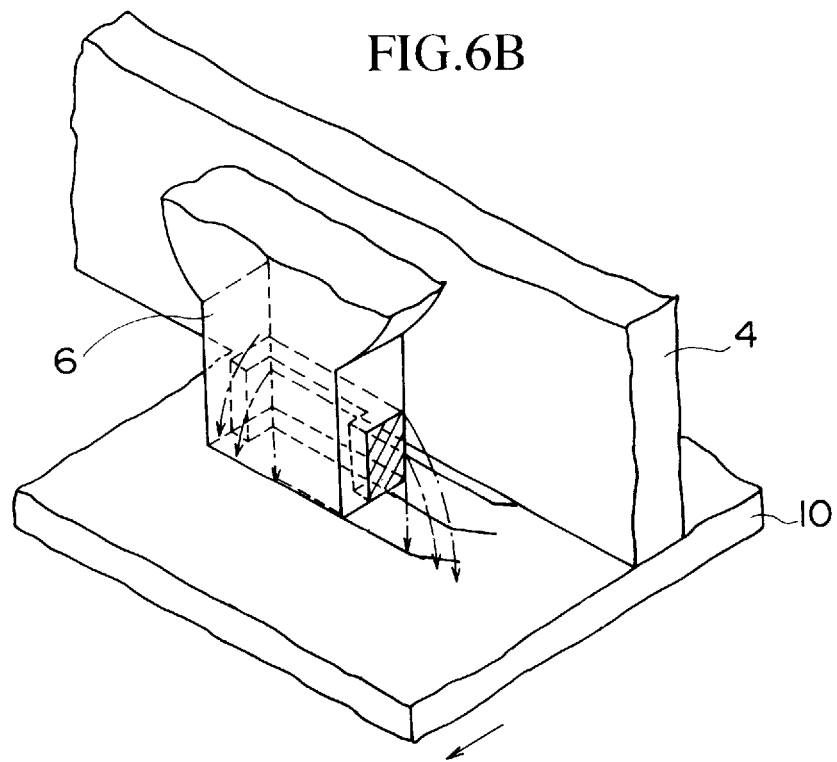
FIG. 6B is a perspective view illustrating process for writing magnetic signals on a magnetic writing material with the use of an MR/IND head according to a comparative example.

With the use of the MR/IND head fabricated as above, the results of writing the magnetic signals will be explained. For the sake of comparison, with the use of the MR/IND head in which no FeN film is formed on the side surfaces of the ABSs of the upper magnetic core 6, the results of writing the magnetic signals have also examined. Writing has been effected in terms of magnetomotive force of 0.5 A-turns which is generated by applying the current to the conductive coil 33. The results of examination are shown in FIGS. 6A and 6B. As shown in FIG. 6A, according to the MR/IND head according to the first embodiment, writing magnetization has not been spread in width nor bent at both end portions thereof. On the contrary, as shown in FIG. 6B, in the comparative example, a width of writing magnetization has been spread, and bending of the writing magnetization has appeared at both end portions of the spreading writing magnetization.

Reasons for the above event would be considered as follows. That is, in the MR/IND head according to the first embodiment, since the FeN film 26b formed on side surfaces of the upper magnetic core 26 on the writing head side (magnetic field outflow side) has high saturation magnetic flux density, magnetic saturation is never caused at the side surfaces of the upper magnetic core 26. Thus, it is believed that lines of magnetic force are generated from an opposing surface of the upper magnetic core 26 to the magnetic writing medium 44 or its neighboring surface, so that they do not spread to the outside of the gap 27.

On the contrary, in the comparative example, as shown in FIG. 6B, part of the ABS of the upper magnetic core 6 of the writing head (magnetic field outflow side) opposing the lower magnetic core 4 and its side parts are magnetically saturated. Therefore, it seems that, owing to such magnetic saturation, magnetic lines of force are generated from parts far from the surface opposing the magnetic writing medium 10.

As explained above, according to the first embodiment, since spread of the magnetic field from the magnetic core to the outside of the gap can be suppressed, writing magnetization has not been spread in width nor bent at both end portions thereof. Thereby, error can be prevented in reproducing the magnetic signals and high density writing can also be achieved.

(2) Second Embodiment

Figure 7:
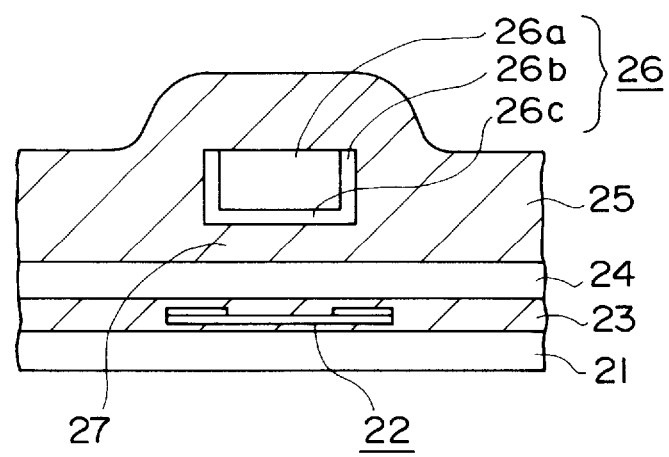
FIG. 7 is a sectional view showing an ABS of an MR/IND head according to a second embodiment of the present invention.

FIG. 7 is a sectional view showing an ABS of an MR/IND head according to a second embodiment of the present invention.

The second embodiment is different from the first embodiment in that the FeN film 26c having high saturation magnetic flux density is formed further on the opposing surface of the upper magnetic core 26 of the writing side (W) opposing to the lower magnetic core 24. In FIG. 7, like references used in FIG. 4 refer to like parts in FIG. 4.

Next, a method for fabricating the MR/IND head according to the second embodiment of the present invention will be explained with reference to FIGS. 8A to 8E. FIGS. 8A to 8E are sectional views showing fabricating steps in the method for fabricating the MR/IND head.

Figure 8A:
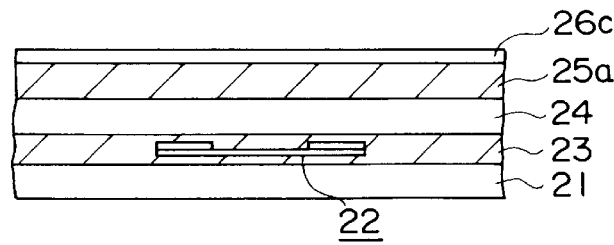
FIGS. 8A to 8E are sectional views showing a method for fabricating the MR/IND head according to the second embodiment of the present invention.

The situation before formation of the upper magnetic core 26 will be illustrated in FIG. 8A. As shown in FIG. 8A, the upper magnetic shield 24 is formed on the lower magnetic shield 21 on the reading side (R) via the insulating film 23 such as alumina film. The MR device 22 is interposed between the lower magnetic shield 21 and the upper magnetic shield 24, and isolated from the lower magnetic shield 21 and the upper magnetic shield 24. On the upper magnetic shield 24 is formed an insulating film 25a which is made of alumina film or silicon oxide film of about 0.1 to 0.6 $\mu$m thick. The distance in the gap of the writing head is defined by the film thickness of the insulating film 25a.

In this state, the FeN film 26c is formed on the insulating film 25a by reactive sputtering to have a film thickness of about o.1 to 1 $\mu$m.

Figure 8B:
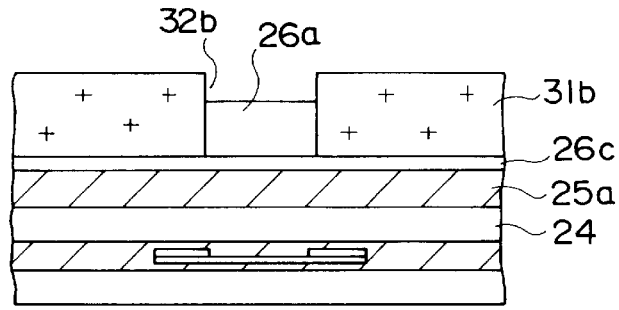

Then, as shown in FIG. 8B, a resist pattern 31b is formed on the insulating film 25a. The resist pattern 31b has openings 32b each having a width of 3 to 4 $\mu$m to form the upper magnetic core 26 on the insulating film 25a. Subsequently, a NiFe film 26a of about 3 $\mu$m thick is formed in the openings 32b of the resist pattern 31b by plating using the resist pattern 31b as a mask.

Figure 8C:
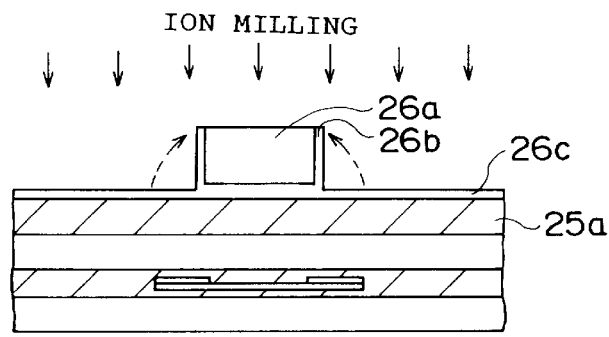

Then, the resist pattern 31b is removed. After this, with the use of ion milling using argon gas at the gas pressure of 2×10-4 Torr, the FeN film 26c formed on the insulating film 25a is etched. At this time, as shown in FIG. 8C, the etched FeN film 26c redeposits to side walls of the NiFe film 26a. In this event, because no etching mask is used, there is no possibility that etching products of the FeN film 26b which stick to the side walls of the etching mask remain as flash.

Figure 8D:
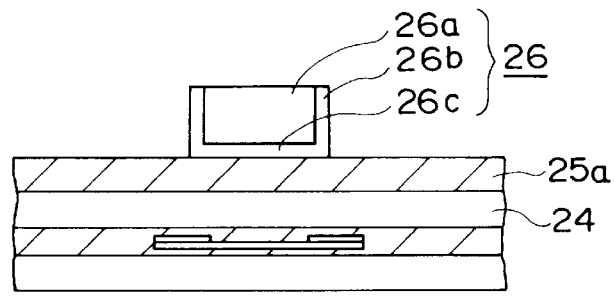

Thereby, as shown in FIG. 8D, the FeN film 26b is formed on the side walls of the ABS of the NiFe film 26a, and the FeN film 26c is also formed on the opposing surface of the ABS of the NiFe film 26a which opposes the lower magnetic core 24. The upper magnetic core 26 is thus finished.

Figure 8E:
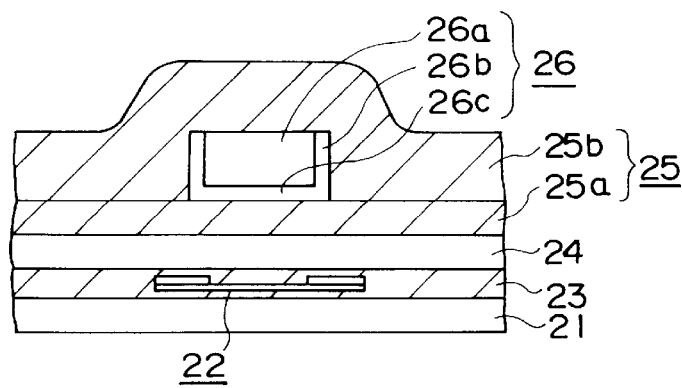

Next, as shown in FIG. 8E, the insulating film 25b made of alumina film or silicon oxide film is then formed to cover the upper magnetic core 26. After this, the magneto-resistive head has been finished through predetermined fabricating steps.

In the MR/IND head thus formed, the FeN films 26b, 26c formed on the side walls and the opposing surface of the ABS of the NiFe film 26a have high saturation magnetic flux density. For this reason, upon writing the magnetic signals, magnetic saturation does not occur in the upper magnetic core 26. Accordingly, magnetic lines of force are generated from the opposing surface of the upper magnetic core 26 to the magnetic writing medium 44 or its neighboring surface so that they do not spread to the outside of the gap 27.

With the above, if the magnetic signals are recorded by the MR/IND head according to the second embodiment, like FIG. 6A, writing magnetization has not been spread in width nor bent at both end portions of the upper magnetic core 26. Therefore, reproducing error in the magnetic signals can be prevented and high density writing can also be achieved.

(3) Third and Fourth Embodiments (Third Embodiment)

Figure 9:
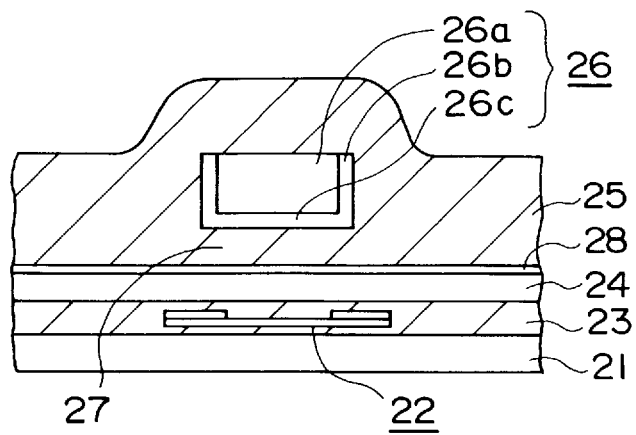
FIG. 9 is a sectional view showing an ABS of an MR/IND head according to a third embodiment of the present invention.

FIG. 9 is a sectional view showing an ABS of an MR/IND head according to a third embodiment of the present invention.

A difference of the third embodiment from the above embodiments is resident in that an FeN film 28 having high saturation magnetic flux density is formed on the surface of the lower magnetic core 24 on the writing side (W) opposing to the upper magnetic core 26. In FIG. 9, like references used in FIG. 7 identify like parts in FIG. 7.

In this case, after the NiFe film serving as the lower magnetic core 24 is formed in FIG. 8A, the FeN film 28 is then formed. The MR/IND head is completed through the same steps explained with reference to FIGS. 8B to 8E.

The lower magnetic core 24 is magnetically saturated, though not saturated so extremely as the narrow upper magnetic core 26, since the lower magnetic core 24 opposes the upper magnetic core 26. Once magnetic saturation of the lower magnetic core 24 occurs, such saturation region extends gradually from the opposing surface to the upper magnetic core 26 to its peripheral portions.

According to the third embodiment, since the FeN film 28 having high saturation magnetic flux density is formed on the surface of the lower magnetic core 24, magnetic saturation can be suppressed on not only the upper magnetic core 26 but also on the area of the lower magnetic core 24 opposing the upper magnetic core 26. As a result, spread of the magnetic field from the magnetic core to the outside of the gap can be suppressed much more.

(Fourth Embodiment)

Figure 10:
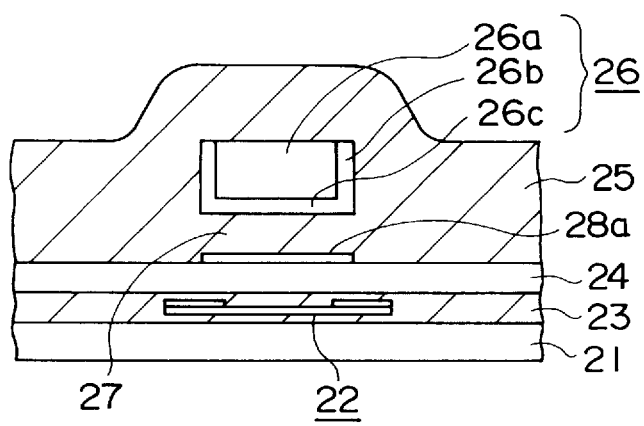
FIG. 10 is a sectional view showing an ABS of an MR/IND head according to a fourth embodiment of the present invention.

FIG. 10 is a sectional view showing an ABS of an MR/IND head according to a fourth embodiment of the present invention.

The fourth embodiment is similar to the third embodiment in that the FeN film 28 having high saturation magnetic flux density is formed on the surface of the lower magnetic core 24 on the writing side (W) opposing to the upper magnetic core 26. However, the fourth embodiment is different from the third embodiment in that the FeN film 28 is limited to an area located beneath the upper magnetic core 26. In FIG. 10, like references used in FIG. 9 designate like parts in FIG. 9.

In this event, after the NiFe film acting as the lower magnetic core 24 is formed in FIG. 8A, the FeN film 28 is then formed and patterned. The MR/IND head is completed through the same steps explained with reference to FIGS. 8B to 8E.

According to the fourth embodiment, since the FeN film 28 having high saturation magnetic flux density is formed on the surface of the lower magnetic core 24, like the third embodiment, magnetic saturation of the area of the lower magnetic core 24 opposing to the upper magnetic core 26 can be suppressed. Consequently, spread of the magnetic field from the magnetic core to the outside of the gap can be suppressed more and more.

As stated above, according to the third and fourth embodiments, spread of the magnetic field from the magnetic core to the outside area of the gap can be suppressed, and therefore writing magnetization has not been spread in width nor bent at both end portions of the upper magnetic core 26. Thus, reproducing error can be prevented and writing of the magnetic signals can also be implemented with high density.

(4) Fifth Embodiment

Figure 11:
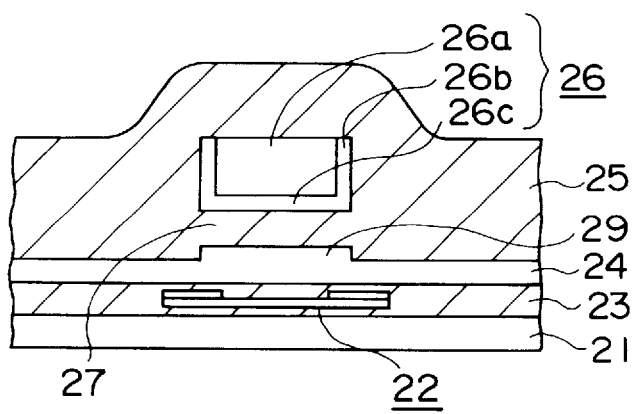
FIG. 11 is a sectional view showing an ABS of an MR/IND head according to a fifth embodiment of the present invention.

FIG. 11 is a sectional view showing an ABS of an MR/IND head according to a fifth embodiment of the present invention.

One respect the fifth embodiment differs from the second embodiment is that a projecting portion 29 of 0.1 to 1 $\mu$m thick is formed on the lower magnetic core 24, which is formed oppose to the upper magnetic core 26 on the writing side (W), to have substantially the same width as the upper magnetic core 26 on an opposing area of the lower magnetic core 24 to the upper magnetic core 26. In FIG. 11, like references used in FIG. 7 identify like parts in FIG. 7.

In this case, after the NiFe film serving as the lower magnetic core 24 is formed in FIG. 8A, it is etched 0.1 to 1 $\mu$m deep by virtue of selective etching. The magnetoresistive head is finished via the same steps explained with reference to FIGS. 8B to 8E.

According to the fifth embodiment, since the lower magnetic core 24 corresponding to the upper magnetic core 26 is projected from another area of the lower magnetic core 24 with the same width as the upper magnetic core 26, magnetic lines of force leaked from the upper magnetic core 26 do not spread to the outside of the gap 27, but enter into the projecting portion 29 on the lower magnetic core 24 through the magnetic writing medium. Accordingly, in cooperation with the magnetic saturation suppressing effect caused by the FeN films 26a, 26b, 26c, spread of the magnetic field in the direction of the writing track width can be suppressed further.

As a result, writing magnetization has not been spread in width nor bent at both end portions of the upper magnetic core 26. Thus, reproducing error can be prevented and high density writing of the magnetic signals can also be achieved.

In the third to fifth embodiments, the FeN film 26c has been formed on the surface of the upper magnetic core 26 opposing to the lower magnetic core 24, but it may be omitted if the FeN films 26b are formed on the side portions of the upper magnetic core 26.

(5) Sixth to Ninth Embodiments (Sixth Embodiment)

Figure 12:
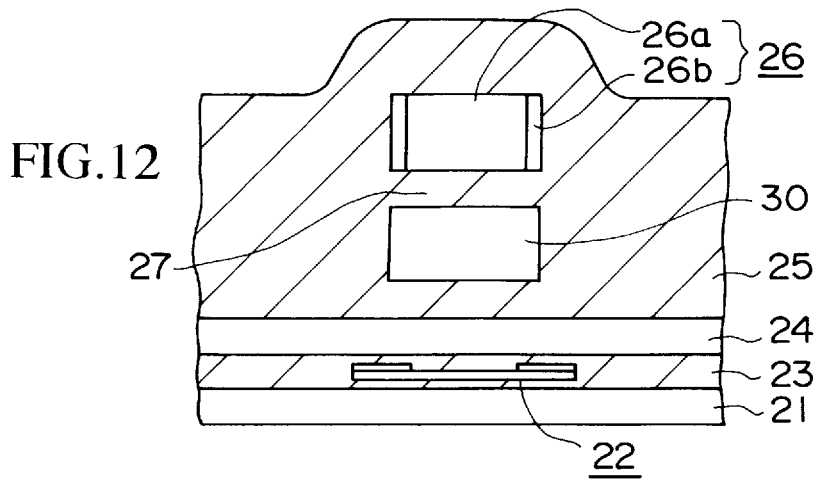
FIG. 12 is a sectional view showing an ABS of an MR/IND head according to a sixth embodiment of the present invention.

FIG. 12 is a sectional view showing an ABS of an MR/IND head according to a sixth embodiment of the present invention.

A difference of the sixth embodiment from the first embodiment exists in that the lower magnetic core 30 opposing to the upper magnetic core 26 on the writing side (W) has substantially the same width as the upper magnetic core 26 and is formed separately from the upper magnetic shield 24 in the reproducing side (R). In FIG. 12, like references used in FIG. 4 signify like parts in FIG. 4.

In this case, like FIGS. 5A and 5B, after the insulating film 25a is formed, the NiFe film (remaining portion) 30a of about 0.5 to 3 $\mu$m thick serving as the lower magnetic core 30 is formed. Subsequently, after the insulating film 25a is formed again, the MR/IND head is finished via the same steps explained with reference to FIGS. 5A to 5E.

According to the above sixth embodiment, since the FeN film 26b is formed on the side portions of the ABSs of the upper magnetic core 26 and the lower magnetic core 30 which has the same width as the upper magnetic core 26 at the ABS of the MR/IND head is formed separately from the upper magnetic shield 24 in the reproducing side (R), magnetic saturation is not caused on the side portions of the upper magnetic core 26 and in addition magnetic lines of force leaked from the upper magnetic core 26 do not spread to the outside of the gap 27 but enter into the lower magnetic core 30 through the magnetic writing medium.

Accordingly, if the magnetic signals are recorded by this MR/IND head, writing magnetization has not been spread in width nor bent at both end portions of the upper magnetic core 26. Thus, reproducing error can be prevented and high density writing of the magnetic signals can also be accomplished.

(Seventh Embodiment)

Figure 13:
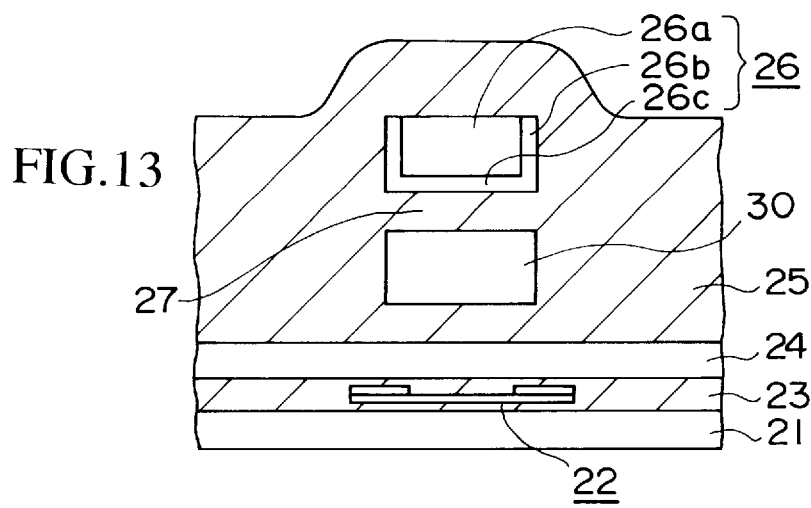
FIG. 13 is a sectional view showing an ABS of an MR/IND head according to a seventh embodiment of the present invention.

FIG. 13 is a sectional view showing an ABS of an MR/IND head according to a seventh embodiment of the present invention.

The seventh embodiment differs from the sixth embodiment in that, at the ABS of the MR/IND head, the FeN film 26c having high saturation magnetic flux density is formed on the surface of the upper magnetic core 26 opposing to the lower magnetic core 30 on the writing side (W). In FIG. 13, like references used in FIG. 12 refer to like parts in FIG. 12.

In this event, as being similar to FIGS. 5A and 5B, after the insulating film 25a is formed, the NiFe film 30a of about 0.5 to 3 $\mu$m thick serving as the lower magnetic core 30 is formed. Subsequently, after the insulating film 25a is formed in succession, the MR/IND head is finished via the similar steps explained with reference to FIGS. 8A to 8E.

According to the above seventh embodiment, since the FeN film 26c is formed on the opposing surface of the upper magnetic core 26 opposing to the lower magnetic core 30 as well as the side walls of the ABSs of the upper magnetic core 26, magnetic saturation can be suppressed on the side portions of the upper magnetic core 26 and the opposing surface of the upper magnetic core 26. Therefore, magnetic lines of force leaked from the upper magnetic core 26 do not spread to the outside of the gap 27, but enter into the lower magnetic core 30 through the magnetic writing medium.

(Eighth Embodiment)

Figure 14:
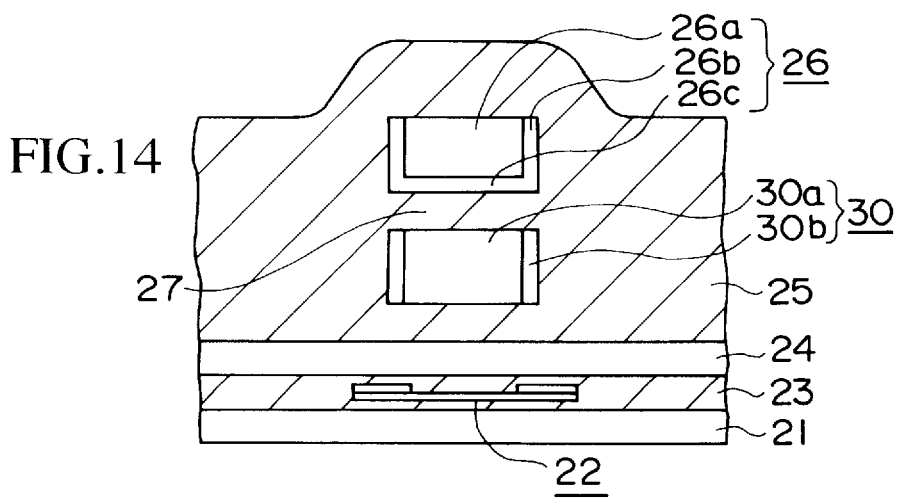
FIG. 14 is a sectional view showing an ABS of an MR/IND head according to an eighth embodiment of the present invention.

FIG. 14 is a sectional view showing a ABS of an MR/IND head according to an eighth embodiment of the present invention.

One respect the eighth embodiment differs from the seventh embodiment is that the FeN film 30b having high saturation magnetic flux density is formed on the side surfaces of the lower magnetic core 30 which has a similar width to that of the upper magnetic core 26 on the writing side (W). Especially, if the lower magnetic core 30 is formed to have the same width as that of the upper magnetic core 26, it becomes more effective since magnetic saturation is easy to occur therein. In FIG. 14, like references used in FIG. 13 denote like parts in FIG. 13.

In this case, in the same manner as described in FIGS. 5A to 5D, after the insulating film 25a is formed, the NiFe film 30a of about 0.5 to 3 μm thick serving as the lower magnetic core 30 is formed, and then the FeN films 30b are formed on the side surfaces of the NiFe film 30a. Subsequently, after the insulating film 25a is formed again, the MR/IND head is finished via the similar steps explained with reference to FIGS. 8A to 8E.

According to the eighth embodiment, since the lower magnetic core 30 which has the similar width to that of the upper magnetic core 26 is formed separately from the upper magnetic shield 24 on the reproducing side (R), magnetic lines of force leaked from the upper magnetic core 26 enter into the lower magnetic core 30 via the magnetic writing medium without spreading to the outside of the gap 27. In addition, since the FeN films 30b with high saturation magnetic flux density are formed on the side surfaces of the NiFe film 30a of the lower magnetic core 30, magnetic saturation of the lower magnetic core 30 can be suppressed and therefore spread of the magnetic field to the outside of the gap 27 can also be suppressed.

(Ninth Embodiment)

Figure 15:
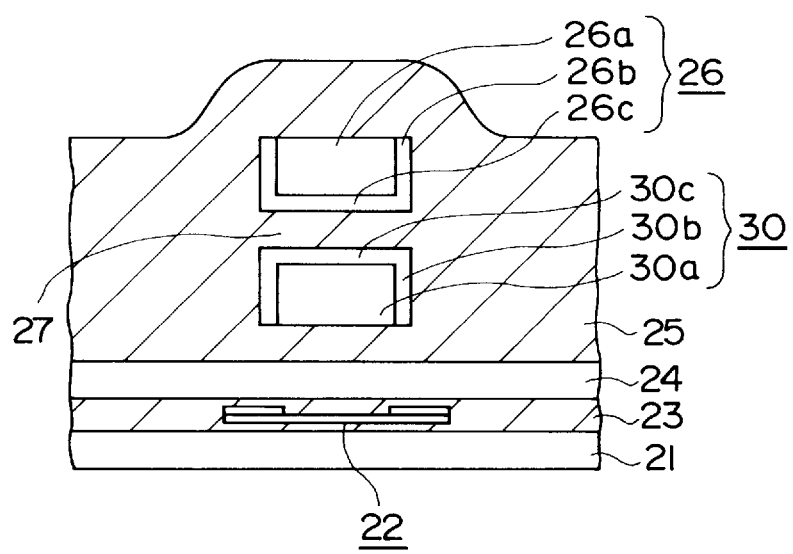
FIG. 15 is a sectional view showing an ABS of an MR/IND head according to a ninth embodiment of the present invention.

FIG. 15 is a sectional view showing an ABS of an MR/IND head according to a ninth embodiment of the present invention.

There is a difference between the ninth embodiment and the eighth embodiment is that the FeN film 30c having high saturation magnetic flux density is also formed on the surface of the lower magnetic core 30 which opposes to the upper magnetic core 26 on the writing side (W). In FIG. 15, like references used in FIG. 14 denote like parts in FIG. 14.

In this case, after the FeN film 30b is formed on the side walls of the lower magnetic core 30 in the same manner as the first embodiment, the NiFe film is formed on the entirety and then patterned so as to leave the FeN film 30c on the lower magnetic core 30. Subsequently, after the insulating film 25a is formed again, the MR/IND head is finished via the similar steps explained with reference to FIGS. 8A to 8D.

According to the ninth embodiment, since the lower magnetic core 30 which has the similar width to that of the upper magnetic core 26 is formed separately from the upper magnetic shield 24 on the reproducing side (R), magnetic lines of force leaked from the upper magnetic core 26 enter into the lower magnetic core 30 through the magnetic writing medium without spreading to the outside of the gap 27. Furthermore, since the FeN films 26b, 26c, 30b, 30c having high saturation magnetic flux density are formed on the side surfaces and the opposing surface of the lower magnetic core 30 and on the side surfaces and the opposing surface of the upper magnetic core 26 respectively, magnetic saturation of the upper magnetic core 26 and the lower magnetic core 30 can be suppressed. Therefore, spread of the magnetic field to the outside of the gap 27 can also be suppressed.

With the above, according to the sixth to ninth embodiments, since spread of the magnetic field to the outside of the gap between the lower magnetic core 30 and the upper magnetic core 26 can be suppressed still more, writing magnetization has not been spread in width nor bent at both end portions. Thereby, error can be prevented in reproducing the magnetic signals and high density writing of the magnetic signals can also be afforded.

Although the high saturation magnetic flux density material is composed of the FeN film throughout the first to ninth embodiments, it is not limited to such film. For instance, FeZrN film, FeTaN film, CoZr film, CoNiFe film, or the like may be used as the high saturation magnetic flux density material. Instead, the high saturation magnetic flux density region may be formed on the side walls of the lower magnetic core 30 or the upper magnetic core 26 by selectively ion-implanting Fe or Co into the soft magnetic layer serving as the lower magnetic core 30 or the upper magnetic core 26.

(6) Tenth Embodiment

Figure 16:
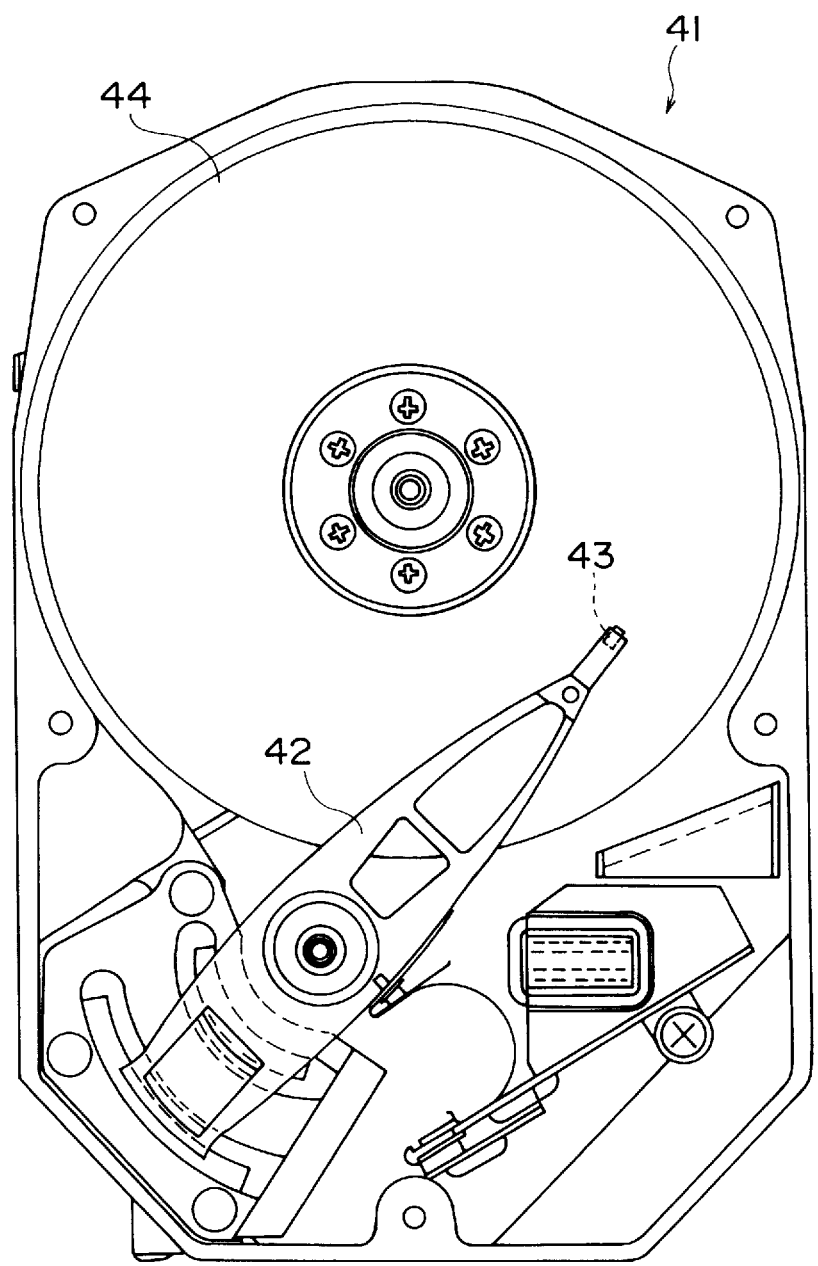
FIG. 16 is a plan view showing a magnetic writing/reading drive according to a tenth embodiment of the present invention, which is equipped with the MR/IND head according to any of the first to ninth embodiments of the present invention.

FIG. 16 is a plan view showing a magnetic writing/reading drive according to a tenth embodiment of the present invention. The MR/IND head according to any of the first to ninth embodiments of the present invention is installed in a slider of the magnetic writing/reading drive.

As shown in FIG. 16, the magnetic writing/reading drive 41 comprises a slider 43 in which the MR head is incorporated, a magnetic disk (magnetic writing medium) 44, and a spring arm for supporting the slider 43.

According to the above magnetic writing/reading drive, since the MR head according to one of the first to ninth embodiments is installed therein, magnetic lines of force which enter from/to the ABSs of the upper magnetic core 26 and the lower magnetic core 30 to/from the magnetic writing medium 44 can be suppressed further more from being spread to the outside of the gap 27.

Therefore, since spread of writing magnetization recorded on the magnetic disk 44 and bending of the writing magnetization at both end portions can be suppressed, errors can be prevented in reproducing the magnetic signals and high density writing of the magnetic signals can also be improved.

As has been described above, in the MR/IND head of the present invention having two magnetic cores ABSs of which are formed oppose to each other via the gap layer, side walls of the ABS of at least one magnetic core are formed to have higher saturation magnetic flux density than that of remaining portion of the ABS.

Hence, upon effecting magnetic writing on the magnetic writing medium, magnetic saturation on the side portions of the magnetic core can be suppressed. Therefore, an outflow area of the magnetic lines of force can be restricted within the opposing surface to the magnetic writing medium and its neighboring area, so that spread of the magnetic field to the outside of the gap can be suppressed. Thus, since magnetization recorded on the magnetic writing medium is not spread in width nor bent at both end portions, the signal error can be prevented in reading the magnetic signals and high density writing of the magnetic signals can also be implemented.

Moreover, since the other magnetic core opposing to one magnetic core is formed to have the substantially same width as that of one magnetic core, lines of the magnetic force flown from one magnetic core do not spread to the outside of the gap but enter into the other magnetic core via the magnetic writing medium. Accordingly, in cooperation with the magnetic saturation suppressing effect caused by one magnetic core, spread of the magnetic field in the direction of the writing track width can be suppressed.

Further, since magnetic saturation occurs easily in the other magnetic core if a width of the other magnetic core is narrowed similarly to that of one magnetic core, it is effective in suppressing magnetic saturation to provide higher saturation magnetic flux density to the side surfaces and the opposing surface of the other magnetic core than the remaining portion of the other magnetic core.

Furthermore, according to the method for fabricating the MR/IND head of the present invention, if the soft magnetic film, e.g., NiFe film, is covered with the high saturation magnetic flux density film, e.g., FeN film, and then patterned by virtue of anisotropic etching, the high saturation magnetic flux density film can be formed on the side walls of the soft magnetic film without the etching mask.

Besides, according to the another method for fabricating the MR/IND head of the present invention, with the use of nature that etching products which are generated when the FeN film is etched in virtue of ion milling, or the like adhere to the side walls of the projection, the high saturation magnetic flux density films can be formed as the etching products on the side walls of the soft magnetic film.

According to the above fabricating methods, because the high saturation magnetic flux density film can be formed on the side walls and the opposing surface of the soft magnetic film without the etching mask, flashes of the high saturation magnetic flux density film do not remain. Since principal portions of the magnetic core are also formed of the NiFe film, generation of cracks can be prevented.

According to the magnetic writing/reading drive of the present invention, since the MR/IND head of the present invention is incorporated therein, magnetic lines of force which enter from/to the ABS of the magnetic core in the writing portion to/from the magnetic writing medium can be suppressed further more from being spread to the outside of the gap. Therefore, since spread of writing magnetization recorded on the magnetic writing medium and bending of the writing magnetization at both end portions can be suppressed, the signal error can be prevented in reproducing the magnetic signals and high density writing of the magnetic signals can also be improved.

Besides, though MR/IND heads(merged MR heads) each having both the writing and reading portions, or methods thereof are showed in FIGS. 3, 4, 5, 7, 8, 9, 10, 11, 12, 13, 14 and 15, the writing (W) and reading (R) portions may be separately formed(a piggyback MR head). In a merged MR head or a piggyback MR head, the writing portion (W) is referred to as a thin film inductive head.

What is claimed is:

1. A thin film inductive head comprising:

a lower magnetic core formed on an under layer;

an insulating layer formed on said lower magnetic core;

a conductor coil passing through said insulating layer substantially in parallel with a surface of said lower magnetic core;

an upper magnetic core formed on said insulating layer, and separated from said lower magnetic core at a narrow part of a front end portion, and contacting said lower magnetic core at a region away from said front end portion;

a gap layer of insulator sandwiched between said lower magnetic core and said narrow part of said upper magnetic core; and first high saturated magnetic flux density films formed on both sides of said narrow part of said upper magnetic core, said first high saturated magnetic flux density films having higher saturated magnetic flux density than that of said upper magnetic core.

2. A thin film inductive head according to claim 1, wherein a second high saturated magnetic flux density film is formed on under surface of said narrow part of said upper magnetic core, said under surface opposing said lower magnetic core.

3. A thin film inductive head as claimed in claim 1, wherein said upper and lower magnetic core form a writing portion, and said lower magnetic core also serves as a magnetic shield of a reading portion.

4. A thin film inductive head as claimed in claim 1, wherein a surface of said front end portion of said lower magnetic core which opposes to said front end portion of said upper magnetic core has a higher saturation magnetic flux density rather than a remaining portion of said lower magnetic core.

5. A thin film inductive head as claimed in claim 1, wherein a part of said front end portion of said lower magnetic core protrudes from a horizontal plane defined by said lower magnetic core, in a direction toward said upper magnetic core.

6. A thin film inductive head as claimed in claim 1, wherein said front end portions of said upper and lower magnetic core opposing to each other have a substantially same width.

7. A thin film inductive head as claimed in claim 6, wherein both side surfaces of said front end portion of said lower magnetic core, which opposes to said front end portion of said upper magnetic core, have a higher saturation magnetic flux density than a remaining part of said lower magnetic core.

8. A thin film inductive head as claimed in claim 7, wherein in addition to said both side surfaces of said front end portion of said lower magnetic core, another surface of said front end portion of said lower magnetic core, which opposes to said front end portion of said upper magnetic core, has a higher saturation magnetic flux density than a remaining part of said lower magnetic core.

9. A magnetic writing/reading drive comprising:

(a) a magnetic writing material for writing magnetic signals thereon; and (b) a thin film inductive head having (1) a writing portion for writing the magnetic signals into said magnetic writing material, said writing portion including upper and lower magnetic cores formed of respective magnetic layers, said upper and lower magnetic cores having a conductor coil interposed therebetween in a vertical direction, front end portions of said upper and lower magnetic cores opposing each other via a gap layer, both side surfaces of said front end portion of said upper magnetic core layer having higher saturation magnetic flux density than remaining part of said upper magnetic core, and (2) a reading portion for reading the magnetic signals from said magnetic writing material.

10. A magnetic writing/reading drive as claimed in claim 9, wherein in addition to said both side surfaces of said front end portion of said upper magnetic core, a surface thereof, which opposes said lower magnetic core, has a higher saturation magnetic flux density than a remaining part of said upper magnetic core.

11. A magnetic writing/reading drive as claimed in claim 10, wherein in addition to said both side surfaces of said front end portion of said upper magnetic core and said surface thereof, which opposes said lower magnetic core, a surface of said front end portion of said lower magnetic core, which opposes said upper magnetic core, has a higher saturation magnetic flux density than a remaining part of said lower magnetic core.

12. A magnetic writing/reading drive as claimed in claim 9, wherein said front end portions of said upper and lower magnetic cores have substantially the same width.

13. A magnetic writing/reading drive as claimed in claim 9, wherein a part of said front end portion of said lower magnetic core, which opposes said front end portion of said upper magnetic core, protrudes from a remaining part of said lower magnetic core.

* * * * *